United States Patent [19]

Vial

[11] Patent Number: 4,614,858
[45] Date of Patent: Sep. 30, 1986

[54] ELECTRIC TOOL FOR DESOLDERING SURFACE MOUNTED DEVICES

[75] Inventor: Harold W. Vial, Newman Lake, Wash.

[73] Assignee: Hewlett Packard Company, Palo Alto, Calif.

[21] Appl. No.: 717,612

[22] Filed: Mar. 28, 1985

[51] Int. Cl.[4] .......................... H05B 1/00; B23K 3/00
[52] U.S. Cl. ..................................... 219/230; 29/764; 219/85 D; 219/233; 219/240; 219/533; 228/51
[58] Field of Search ........ 219/221, 227, 230, 233–235, 219/240, 241, 533, 85 D; 228/51-55, 57, 20, 19; 87/9.5 R, 9.5 A, 9.5 B, 9.51; 29/764

[56] References Cited

U.S. PATENT DOCUMENTS

| 3,139,777 | 7/1964 | Gindoff | 219/233 X |
| 3,230,338 | 1/1966 | Kawecki | 219/85 D |
| 3,673,384 | 6/1972 | Burman et al. | 219/233 X |
| 3,752,017 | 8/1973 | Lloyd et al. | 219/233 X |
| 3,990,863 | 11/1976 | Palmer | 219/230 X |

FOREIGN PATENT DOCUMENTS 1460803 1/1977 United Kingdom ................ 219/233

*Primary Examiner*—A. Bartis
*Attorney, Agent, or Firm*—Leslie G. Murray

[57] ABSTRACT

A desoldering tool for removing soldered electronic components from printed circuit boards includes a plurality of electric heater bars disposed in spaced apart, opposed relationship so as to grasp the component to be removed. The heater bars are shaped to contact the solder terminations to be desoldered and are composed of an alloy of high electrical resistivity, such as Nichrome. The heater bars are each removably attached to a pair of cantilever spring plates carried by the enlarged end of the handle of the desoldering tool by a different pair of bus bars enclosed in a molded plastic housing providing support and electrical insulation. One bus bar of each pair is rigidly attached to one spring plate while the other bus bar is attached to the other spring plate so that the cantilever spring plates urge the heater bars against the solder terminations and retain the component for physical removal. The leads of a power cord extending through the handle are electrically connected to the spring plates for supplying heating current to the heater bars through the bus bars.

7 Claims, 6 Drawing Figures

ELECTRIC TOOL FOR DESOLDERING SURFACE MOUNTED DEVICES

BACKGROUND OF THE INVENTION

The present invention relates generally to desoldering tools and more particularly to a tool to desolder and remove single and multi-lead electronic components that are mounted on a printed circuit board with no damage to the component or the printed circuit board and surrounding circuitry.

Present desoldering tools, though capable of desoldering soldered connections, have numerous disadvantages due to their construction, size, method of use and overall cost to purchase and maintain. Most of the desoldering tools presently utilized for removal of soldered electronic components are limited to the heating of the component leads individually or collectively in the surrounding mounting surface to the point that the solder is molten. The electronic component is then manually extracted from the mounting surface in a separate operation. Further, damage to the mounting surface frequently employing copper-clad circuitry can result from the prolonged application of heat.

An example of a prior art desoldering tool is disclosed in U.S. Pat. No. 3,644,980, entitled Component Removal Device, issued to Charles A. Clas, Jr., et al. on Feb. 29, 1972. The apparatus disclosed employs a trough of molten solder that has been heated to a high temperature as a heating medium. The mounted electronic component is positioned on a support platform above the heating medium in a set of jaws retracted to grip the component. The combination is then lowered in such a manner that the protruding component leads only contact the heating medium and the securing solder is melted without the mounting surface being heating appreciatively. Once the securing solder has been melted the component is physically removed from the mounting surface by action of the gripping jaws. While the desoldering tool disclosed in U.S. Pat. No. 3,644,980 provides fairly effective solutions to some of the above-mentioned disadvantages, it represents some drawbacks of its own. Because of its physical size and complexity, the desoldering apparatus is not portable and tends to be unwieldy and difficult to use in a small working space. Further, use of the tool requires that the leads of the mounted component protrude through the printed circuit board or other mounting surface.

SUMMARY OF THE INVENTION

The present invention provides a portable desoldering tool which permits the removal of single and multi-lead electronic components, such as transistors and integrated circuit modules, from a printed circuit board or some other mounting surface with no damage to the mounting surface, associated circuitry or the component. The desoldering tool comprises a molded handle and electrically-resistive metal alloy heater bars, each heater bar removably mounted to a different pair of electric bus bars. Each pair of bus bars is fixedly mounted in a molded plastic housing to provide mechanical support and electrical insulation. One bus bus of each pair is attached to a first cantilever spring while the other bus bar of each pair is attached to a second cantilever spring. The two cantilever springs separated by insulating plates, are fixedly attached to a mounting plate which is mounted within one end of the molded handle. A controlled electric current heats the heater bars to a sufficiently high temperature to melt the solder. The heater bars are clamped against the solder fillets to be melted by action of the dual cantilever springs. The clamping action improves heat transfer to the solder joints and provides a retaining force on the leads of the component to facilitate component removal when the solder has melted.

DETAILED DESCRIPTION OF THE INVENTION

Figure 1:
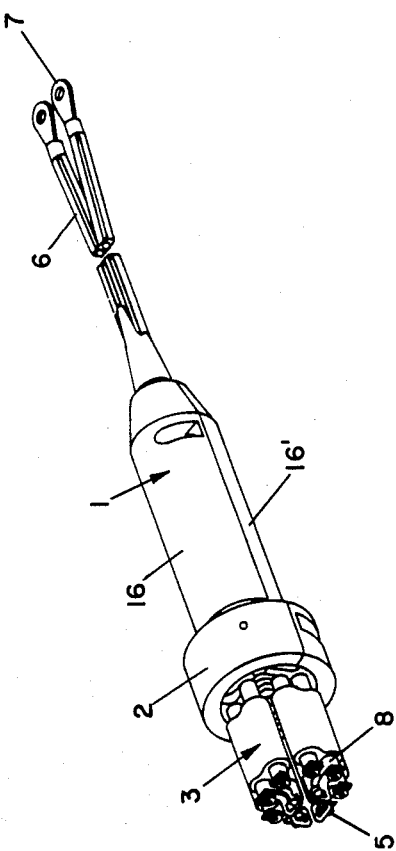
FIG. 1 is a perspective view of the desoldering tool according to the present invention.

Referring now to FIG. 1, a desoldering tool according to the present invention is illustrated. Briefly, the desoldering tool includes a molded handle 1 comprising two identical halves 16 and 16' molded of high strength thermal plastic. Handle 1 has an enlarged section 2 at one end for housing the heater mounting assembly 10 (shown in FIG. 2), and heater bars 5 mounted on electric bus bar pairs 3. Electric power cord 6 provides connection to a variety of power supplies (not shown) ranging from a simple variable current manually timed supply to a thermocouple controlled, timed power supply to operate the heater bars at a preset temperature for a predetermined time period.

Figure 2:
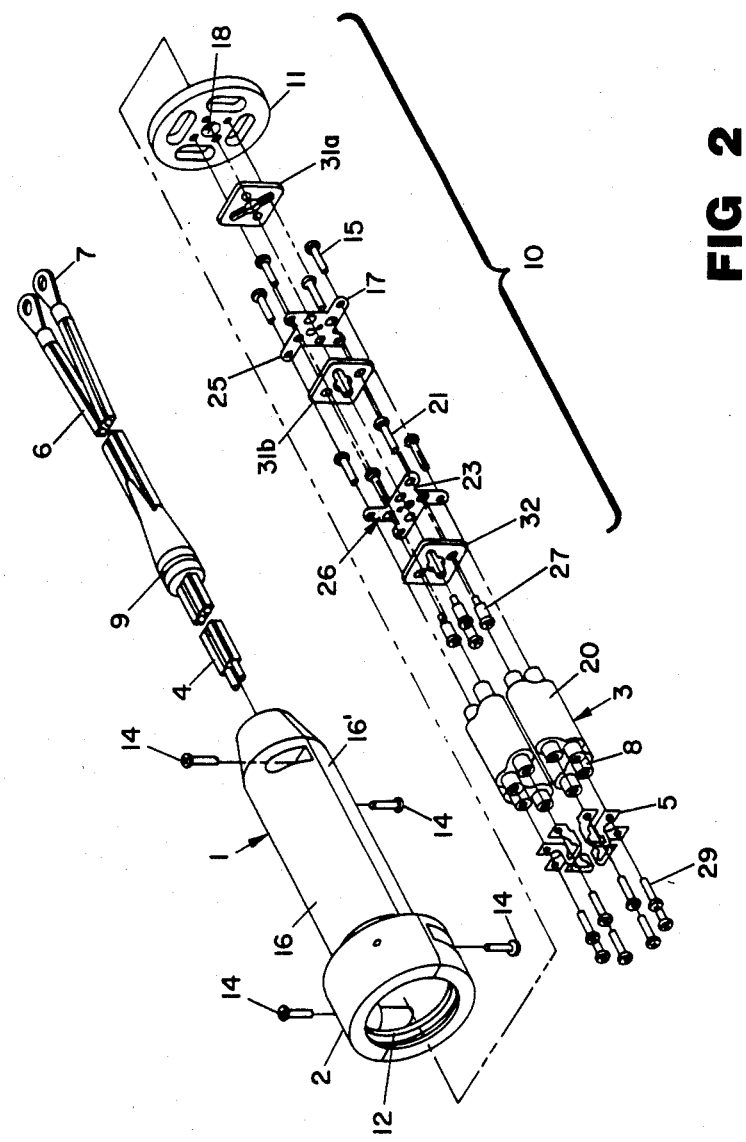
FIG. 2 is an exploded view in perspective of the desoldering tool shown in FIG. 1.
Figure 3A:
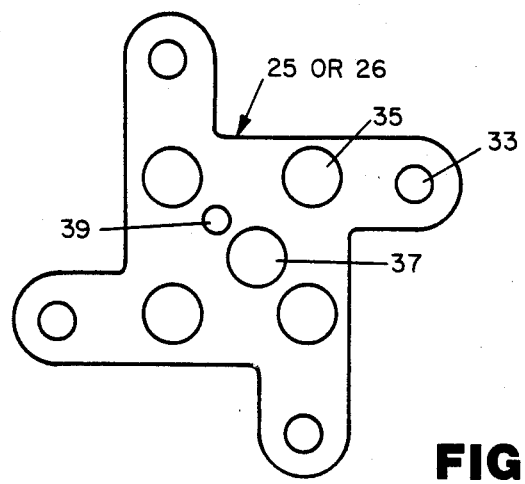
FIG. 3a is a plane view of the cantilever spring shown in FIG. 2.
Figure 3B:
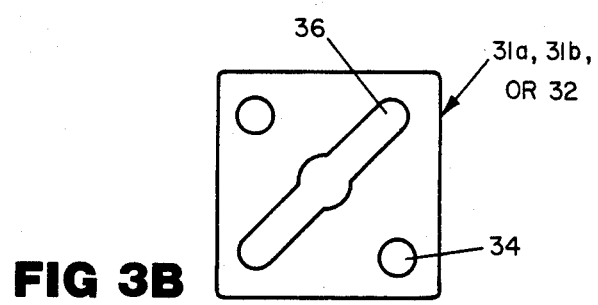
FIG. 3b is a plane view of the insulator shown in FIG. 2.

Referring now to FIGS. 2, 3A and 3B, handle 1 is molded of high strength thermal plastic and is designed as a reversible part allowing the use of two identical parts to form a full handle to house the heater assembly 10 in its enlarged end 2 and to enclose the power cord leads 4 and molded cord strain relief 9. The handle 1 also insures operator comfort by insulating the operator from the high temperature heater bars 5. The heater bars 5 are composed of a metal alloy with high melting point and high resistivity which does not disintegrate or corrode at high temperatures. The alloy when heated forms an oxide layer which is non-wettable by common solder alloys provided that strong acid fluxs are not present. (A nickel-chromium-iron alloy such as Nichrome is a suitable material for this purpose.) The heater bars 5 are attaced to bus bars 8 with screws or rivets 29. The bus bars 8 are made of a highly conductive metal, such as copper, and rigidly mounted in pairs 3 in housing 20 molded of high strength thermal plastic for electrical and thermal insulation and mechanical support.

The heater mounting assembly 10 comprises a stamped steel mounting plate 11, two insulator plates 31a, 31b two cantilever springs 25 and 26 and a screw plate 32. The cantilever springs 25 and 26 are made of a highly conductive spring alloy metal (an alloy such as phosphor bronze is a suitable material for this application) to provide clamping action of the heater bars 5 (to be more fully described hereinafter) and to provide electrical connection between the power cord 6 and the bus bars 8. Cantilever springs 25 and 26 are identical parts (as shown in FIG. 3a), with spring 26 reversed 180 degrees from spring 25. The insulator plates 31a, 31b are molded of high strength, high temperature resistant thermal plastic for insulating the cantilever springs 25 and 26 from each other and from the mounting plate 11. The insulator plate 31a, 31b is a flat plate with two holes 34 and a diagonal slot 36; the radius of slot 36 at each end is the same as the radius of the holes 34. The mounting plate 11 is stamped from corrosion resistant steel and is held in place in an interior circumferental slot 12 formed by the enlarged housing 2 of the handle 1 and provides mechanical mounting for the heater mounting assembly 10 within the housing 2 of handle 1. The screw plate 32 is stamped of corrosion resistant steel or some other suitable material (in the preferred embodiment shown in FIG. 2 a third insulator plate is utilized as screw plate 32). When assembled, screw plate 32 controls the flexure point of the cantilever springs 25 and 26.

Assembly of the heater mounting assembly 10 is as follows: as shown in FIG. 2, screw plate 32, insulator plates 31a, 31b and cantilever springs 25 and 26 are attached to the mounting plate 11 by four screws 27. Cantilever springs 26 and 25 and mounting plate 11 are separated from each other by insulator plates 31a, 31b insulator 31a is rotated 90 degrees clockwise from and insulator 31b. Mounting screws 27 (4) are inserted through holes 34 and the ends of slot 36 in the screw plate 32 and insulator plates 31a, 31b and through corresponding holes 35 (4) in cantilever springs 25 and 26 and tightened in threaded holes provided in mounting plate 11. The electric power leads 4 are threaded through a central bore 18 in mounting plate 11 and slot 36 in insulator 31a. One lead is soldered to cantilever spring 25 in hole 39 and the other lead is threaded through hole 37 in cantilever 25 and slot 36 in insulator 31b and soldered to cantilever spring 26 in holes 39. The bus bars 8 are fixedly attached to the tabs protruding from the corners of cantilever springs 25 and 26 with screws 15 and 21. One bus bar 8 of each pair 3 is fixedly attached to cantilever spring 25 via tabs 17 with screws 15, and the other bus bar 8 of each pair 3 is fixedly attached to cantilever spring 26 via 23 with screws 21. A complete electric circuit is formed which includes heater bar 5 thereby providing directly heated heater bars. The desoldering tool is held vertically with respect to a mounting surface (not shown) and heater bars 5 are slightly force fitted over and around the component (not shown) desired to be removed. As the heater bars 5 are forced over the component, the heater bars 5 are spread apart which causes the tabs on the cantilever springs 25 and 26 to be deflected from the plane of the springs. Deflection of the cantilever spring tabs results in a restoring force proportional to the amount of deflection which causes the heater bars 5 to be forced inward against the solder fillets to be melted. The clamping action thus provided increases heat transfer from the heater bars 5 to the solder joints and provides a retaining force on the component leads for removal of the component when the solder is in a molten state. The heater bar 5 geometry provides a low means, high temperature plane across the major dimension of the heater bar cross section. The high temperature plane is normal to the plane of the component mounting surface insuring minimum heat transfer to the mounting surface. When electric current is supplied to the heater bars 5 the solder melts and the cantilever springs 25 and 26 force the heater bars 5 through the molten solder against the component leads to retain the component. The component is then removed by vertically withdrawing the desoldering tool fromm the mounting surface.

Figure 4:
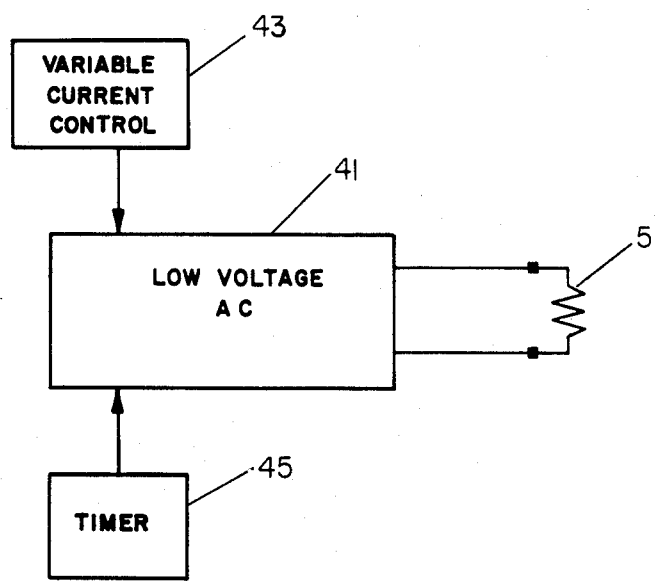
FIG. 4 is a block diagram of the power supply for the desoldering tool illustrated in FIG. 1.

Referring now to FIG. 4, the power supply 41 comprises an adjustable current low voltage AC supply. A variable current control 43 provides a repeatable, precise current setting capability. Use of a high resolution timer 45 insures that the required amount of power is supplied to the heater bars 5 for each operation. Use of the timer 45 also insures that the heater bars 5 are not energized for long periods of time when not in use. Thermocouple controlled feedback circuits (not shown) may also be used to control the power delivered to the heater bars 5.

Figure 5:
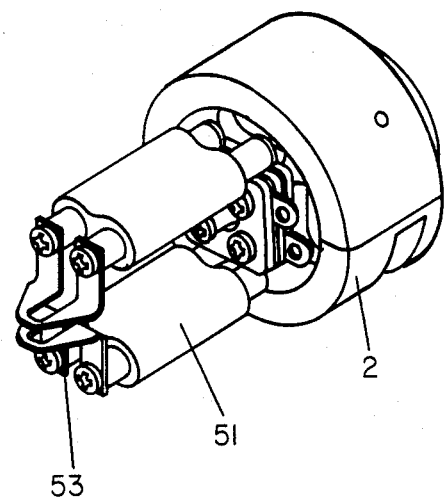
FIG. 5 is a perspective view of a modified embodiment of the heater bars for the desoldering tool illustrated in FIG. 1.

Referring now to FIGS. 2 and 5, the heater bar 5 configuration illustrated in FIG. 2 is suitable for many applications involving generally square components. The configuration of the heater bars 53 as shown in FIG. 5 may be more suitable for applications involving rectangular DIP components. The configuration illustrated in FIG. 5 utilizes two heater bars 53 and two bus bar pairs 51 which are identical to the heater bars 5 and bus bar pairs 3 utilized in the configuration shown in FIG. 2. Different heater bar geometries and shapes may be utilized as required for special applications. As the heater bars 5 are attached to the bus bars 8 with screws 29, it is a simple procedure to change the heater bar configuration as required for any application.

I claim:

1. A desoldering tool for removing soldered electronic components from printed circuit boards or the like, said desoldering tool comprising:
   a plurality of shaped heater bars disposed in spaced apart, opposed relationship so as to grasp the component to be removed, said heater bars for contacting solder terminations to be desoldered and heating the solder to its melting temperature, said heater bars being composed of an electrically conductive material having a high electrical resistivity;
   power supply means adapted to be coupled to the heater bars for supplying electrical current to the heater bars;
   cantilever spring means urging said heater bars against said solder terminations and retaining the component for physical removal;
   coupling means electricaly coupling the power supply means to the heater bars and fixedly attaching said heater bars to said cantilever spring means, said heater bars being removably attached to the coupling means; and
   a handle having an enlarged end, said enlarged end including mounting means, said mounting means disposed within said enlarged end, said cantilever spring means being fixedly mounted on said mounting means, said heater bars being disposed adjacent said enlarged end, said handle providing mechanical support and electrical and thermal insulation.

2. A desoldering tool as in claim 1 wherein said shaped heater bars comprise removable plates shaped to conform to the component which is to be removed.

3. A desoldering tool as in claim 2 wherein said cantilever spring means comprise two flat spring plates of an electrically-conductive spring alloy metal, said spring plates separated by an insulator plate.

4. A desoldering tool as in claim 3 wherein said coupling means include electric power leads soldered to the flat spring plates comprising the cantilever spring means for electrically connecting the power supply to said spring plates and a plurality of bus bar means fixedly attached to the heater bars and to said spring plates to provide electrical connection between the heater bars and said spring plates, said bus bars also providing rigid mechanical connection between the heater bars and said spring plates to support said heater bars on said enlarged end of the handle and transmit the force resulting from a deflection of said spring plates, said force urging the heater bars against said solder terminations.

5. A desoldering tool as in claim 4 wherein said plurality of bus bars comprise pairs of short rods of a highly conductive metal, each pair of said rods being separately encased in a housing molded of a high strength thermal and electrical insulating material, one end of each rod of each of said pairs of rods rigidly attached to a different one of said spring plates and the other ends of each pair of rods removably connected to a different one of said plurality of heater bars.

6. A desoldering tool as in claim 5 wherein said spring plates have a plurality of tabs spaced around the perimeter of said spring plates, each rod of said pairs of rods rigidly attached to a different one of said tabs on a different one of said spring plates, said tabs providing a restoring force when deflected from the plane of said spring plates urging the heater bars against said solder terminations.

7. A desoldering tool as in claim 6 wherein said handle comprises two identical parts molded of high strength thermal plastic coupled together to form the handle.

* * * * *